3,172,025
LINEAR SERVO MECHANISM
Clarence S. Jones, Los Altos, and Svein B. Rasmussen, Menlo Park, Calif., assignors to General Precision, Inc., Binghamton, N.Y., a corporation of Delaware
Filed May 16, 1960, Ser. No. 29,395
8 Claims. (Cl. 318—22)

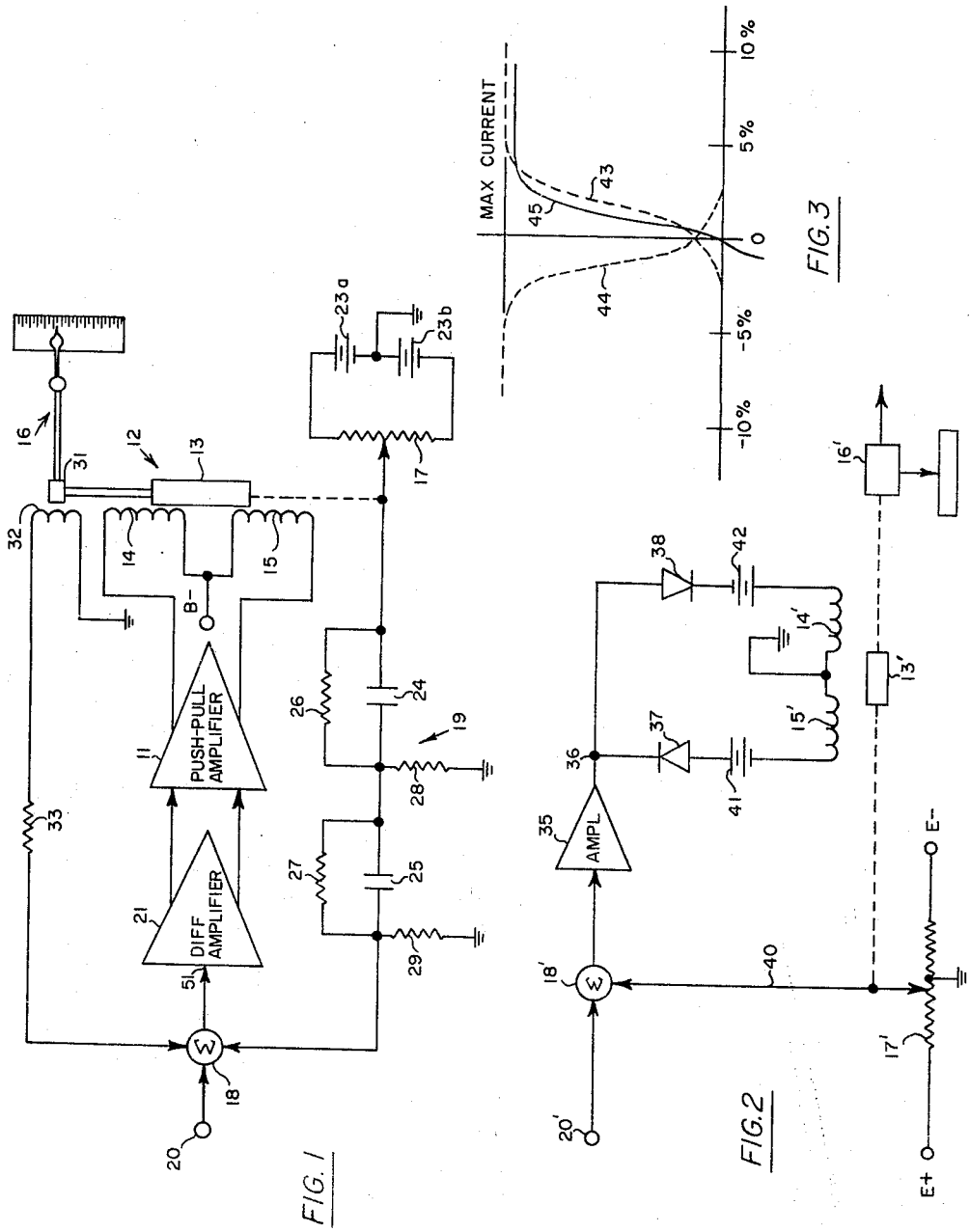

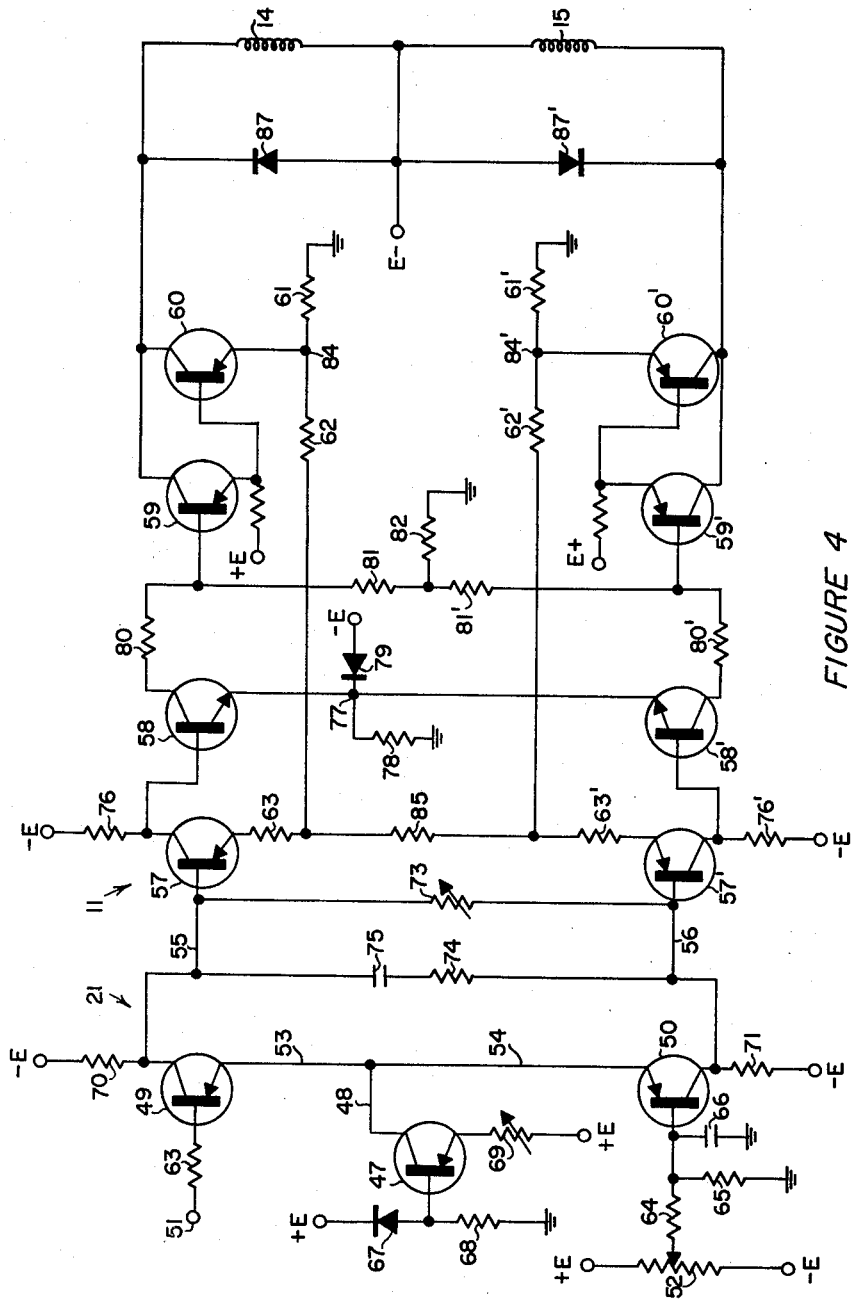

This invention relates to servo-mechanisms, and more particularly to drive apparatus for imparting controlled linear movements and displacements to a load device in response to electrical control or command signals.

Automatic control systems lie in two general classes: open loop controls and closed loop or servo controls. An open loop control acts in accordance with the dictates of some arbitrary quantity, and its accuracy is dependent wholly upon the linearality of its mechanism or upon a proper calibration. On the other hand, a closed loop control, or servo-mechanism may act initially in accordance with the dictates of an arbitrary quantity, but ultimately will act in accordance with the output or result of the control operation. An essential feature of a servo-mechanism is that error between a state desired and the state existing is constantly measured, and a driving force is created to correct the error if it exists. Thus, a servo system senses the accuracy of its performance at all times during operation, and continually tends to keep its output state in agreement with an input or command signal.

Servo systems may have a disadvantage in that an insensitive band of operation, or dead zone, may exist near the optimum output level in which the error signal is so slight that insufficient drive power is created to cause any change in the output. This insensitive band may create a "backlash" or jerkiness detrimental to the servo operation, since the drive power is not a continuous function of the error signal over the whole range of servo operation.

One contemplated application for a servo mechanism is to provide a rectilinear drive for a function generator of an analog computer such as disclosed in a co-pending United States patent application, Serial No. 814,898 entitled "Apparatus and Method for Analog Function Generation" filed on May 21, 1959, by Svein B. Rasmussen, one of the co-inventors in the instant application. This system for analog function generation utilizes two similar servo-mechanisms for positioning along two different axes in accordance with two independent input quantities, and an output signal is developed corresponding to a mathematical or empirical function of the two input quantities. Obviously, the accuracy of an analog computer using such a system depends on the accuracy of the servo positioning; and therefore, the servo-mechanisms involved must operate with a high degree of accuracy and must be free from inaccuracies due to backlash or the insensitive band of operation.

The analog function generator as disclosed in the co-pending patent application No. 814,898, supra, uses a linear motor having opposing solenoid windings, through which a maximum drive current of 10 amperes may be passed. This current is supplied by a servo drive amplifier; and since this represents a substantial maximum power output, it is desirable that the servo system have an economical mode of operation at least during times of maximum driving power.

It is an object of this invention to provide an improved servo-mechanism requiring a minimum of power dissipation, and more specifically, it is an object to provide such a system operating essentially class B during large excursions to minimize the power consumption when the positioning error is excessive.

Another object of this invention is to provide an improved servo-mechanism wherein "backlash," or dead zone, are substantially eliminated; and more specifically, it is an object to provide a direct drive connecting with a linear motor to minimize mechanical backlash, and to further provide the motor with a pair of opposing solenoid windings which may be selectively energized to exert a force of a selected direction upon an armature, but which will be both energized to create opposing forces on the armature which tend to cancel during times when the servo error signal is of slight value to minimize the backlash which could result from an electrical dead zone.

A further object of this invention is to provide an improved servo system including an amplifier capable of supplying controlled direct currents to a pair of windings of a servo motor, and more specifically it is an object to provide an improved push-pull amplifier capable of passing direct currents and including paths for negative feedback of signals corresponding to the current flow in the windings.

A further object is to provide an improved amplifier circuit for driving a servo motor, and more specifically to provide such an arrangement having a differential amplifier input stage coupled to a push-pull amplifier such that an input command signal may be compared to a calibration voltage for developing a difference voltage which is further amplified in the two branches of the push-pull amplifier.

Numerous other objects and advantages will be apparent throughout the progress of the specification which follows. The accompanying drawings illustrate certain selected embodiments of the invention and the views therein are as follows:

FIGURE 1 is a circuit diagram partially in blocks disclosing one form of this invention;

FIGURE 2 is a circuit diagram of another embodiment of this invention;

FIGURE 3 is a graphical representation of the currents and armature forces generated by the servo-mechanism of this invention; and FIGURE 4 is a complete circuit diagram of the servo amplifier arrangement of this invention which is shown as blocks in FIGURE 1.

Briefly stated, with reference to FIGURE 1, the servo-mechanism of this invention includes a direct current amplifier 11 coupled to pass current to a pair of windings of a solenoid linear drive motor 12. The motor 12 includes an armature 13 which may be a soft iron or ferrite rod movable linearly within or between two windings 14 and 15 directly connected to drive a load device 16 shown schematically as a pointer movable along a scale. The armature 13 also moves a sliding contact of potentiometer 17 which constitutes a means for generating a voltage indicative of the servo output position. The position-indicating voltage thereby generated is fed back to a summing point 18 and to the input of the amplifying circuits. A frequency and/or phase correction network 19 may be included in the feedback path between the potentiometer 17 and the amplifier summing point 18. An input or command voltage is applied to an input terminal 20 and combined with the position indicating voltage at the implifier summing point 18 to produce an error signal. A differential amplifier 21, together with push-pull power amplifier 11 receives the error signal and passes corresponding currents through the push-pull solenoid windings 14 and 15, developing corresponding magnetic fields for moving the armature 13.

The amplifier 11 develops and passes an output current through the windings 14 and 15 which is class B during times when a substantial error signal is present, and which operates class A when the error signal is slight. During class B operation, a current corresponding to the error is passed through a selected one of the windings 14 and 15 while the opposing winding is cut off. On the other hand, during class A operation current is continuous in both the windings 14 and 15. When the error is zero (when the actual position of the armature 13 and load device 16 agrees with the desired position), balanced currents will exist in the two windings 14 and 15 thereby causing equal and opposite forces and permitting the armature 13 to come to rest. If the error signal is great, a substantial current will flow in one of the windings 14 or 15, and when the error becomes less, that current will become correspondingly less. However, when the error approaches zero, current will commence flowing in the opposite winding, giving rise to the class A operation with simultaneous current flow in both windings, providing oppositely-acting fluxes.

The particular means for developing a position-indicating voltage shown in FIGURE 1 includes the potentiometer 17 and a voltage supply indicated as batteries 23a and 23b. The mid-point of the voltage supply 23a–23b is grounded to establish a reference potential which will also appear at an intermediate point between the extremes of the potentiometer 17. Therefore, if the potentiometer slider moves from one extreme to its opposite extreme, the position indicating voltage developed thereon will vary from a high value of a first polarity, decreasing to zero, and then increasing to a high value of the opposite polarity.

The network 19 may be termed "a double lead network" and includes a pair of serially connected capacitors 24 and 25, each of which is bypassed by a resistor 26 and 27, and wherein two additional resistors 28 and 29 provide a shunt path to ground. The effect of this network 19 is to generally attenuate the low frequency currents while passing the higher frequency currents without attenuation but with a positive or forward phase shift. The attenuation of low frequency currents is accomplished by the resistive network (disregarding the capacitors), since the low frequency currents must pass through the resistors 26 and 27 while a portion of the currents are by-passed to ground through the resistors 28 and 29. High frequency currents are passed by the capacitors 24 and 25 with low attenuation, but the capacitors tend to shift the phase and cause the high frequency currents at the summing point 18 to lead the currents produced at the potentiometer 17.

The purpose of the frequency and phase correction network 19 is to provide complementary characteristics as compared with the mechanical characteristics of the armature. While the armature will respond accurately with low frequency control currents which may flow through the windings 14 and 15, it will lag behind the higher frequency currents tending to cause a response error in the output movement of the load device 16. Thus, for example, if a slowly changing or low frequency command voltage is applied to the terminal 20, the response of the armature 13 may accurately follow the changes. However, if a high frequency oscillation were applied to the input terminal 20, the armature 13 will more sluggishly respond due to its inherent inertia, and its movement will lag behind the input oscillations. Therefore, it may be appreciated that the inertia effects of the armature 13 and load device 16 will have comparatively slight attenuation and phase shift for low frequencies, but will have a greater attenuation and will lag in phase with high frequencies. Since the network 19 will provide the greater attenuation for the low frequencies, while causing the higher frequencies to shift ahead in phase, it is obvious that the effect thereby will complement and tend to neutralize the inertia effects of the moving elements.

In some servo applications, it is desirable to provide a feedback indicative of the rate or velocity of movement in addition to the feedback indicative of positioning. FIGURE 1 shows an arrangement for providing a rate indicating feedback which includes a small permanent magnet 31 attached to and movable with the armature 13 and the load device 16. A pickup winding 32 is magnetically coupled to the magnet 31. A voltage will be induced in the winding 32 which is proportional to the rate of change of magnet flux through the pickup windings, and therefore, is proportional to the velocity of movement of the magnet 31. This voltage, corresponding to the rate of movement may be fed back to the summing point 18 through an appropriate coupling means shown in FIGURE 1 as a resistor 33. In a servo application using a rate feedback, the velocity indicating voltage is arranged to oppose or subtract from the error signal. Thus, if the rate of movement of the armature 13 is slight, the rate feedback will have little effect; but during times when the armature is in rapid movement the voltage indicative of the rate will substantially reduce the error signal. The effect of rate feedback in a servo sysem is to damp high velocity movements and to prevent overshooting a final position.

FIGURE 2 shows an alternative form of this invention using an operational amplifier 35 capable of passing direct currents of either a positive or a negative polarity to an output lead 36. A pair of diodes 37 and 38 are coupled to the amplifier output 36 as shown, with a reversed polarity with respect to each other. If the amplifier 35 provides an output voltage at the point 36 which is substantially positive, the diode 38 will be biased into conduction while the diode 37 will be cut off, and therefore, a substantial current will flow in a winding 14' while no current will flow in a winding 15', and as a result the armature 13' will be moved to the right (as indicated in FIGURE 2). On the other hand, if the amplifier 35 furnishes an output voltage which was substantially negative at point 36, the diode 38 would be cut off and the diode 37 would permit current to flow in the winding 15'. Thus, the armature 13' would be urged to the left.

As was described in connection with FIGURE 1 the armature 13' is directly connected to move a load device 16' and the movable contact of a potentiometer 17'. The potentiometer 17' has its ends connected to voltage sources of opposite polarities while its mid-point is grounded, and therefore, the potentiometer 17' constitutes a means for generating a position indicating voltage similar to the potentiometer 17 of FIGURE 1. The position indicating voltage is fed back by a lead 40 to the summing point 18' of the amplifier 35. The position indicating voltage is subtractively combined with the control or command voltage which may be applied to the input terminal 20' and an error signal is thereby developed and applied to the amplifier 35.

In addition to the diodes 37 and 38, the windings 14' and 15' are coupled to the amplifier output terminal 36 by a direct voltage biasing means shown in FIGURE 2 as batteries 41 and 42. These biasing means 41 and 42 provide a forward bias voltage which will render both the diodes 37 and 38 conductive when the potential of the point 36 is approximately zero.

To understand the operation of the circuit of FIGURE 2, we may first consider the operation of the servo circuit without the voltage sources 41 and 42. During times when the error signal is substantial in magnitude, one of the diodes 37 or 38 will conduct current while the other will be cut off, which is termed class B operation. However, when the error signal becomes slight, a small voltage appearing at point 36 will be insufficient to overcome the forward bias or potential drop across the the diodes 37 or 38. Therefore, in the absence of the voltage sources 41 and 42, a dead zone will exist wherein weak error signals will not pass current through either of the windings 14' or 15'. This dead zone would result in a backlash or jerky operation as was previously discussed.

The effect of providing the direct voltage sources 41 and 42 to eliminate the dead zone by permitting a class A type of operation during times of weak error signals. At such times, currents will flow in both the windings 14' and 15', but may be unbalanced by the amount of the error. The biasing means 41 and 42 provides a voltage which is somewhat greater than the forward voltage drop across the diodes 37 and 38. Obviously when the error voltage is substantial, the forward biasing of one of the diodes 37 or 38 will be overcome resulting in a complete cut off of current therethrough, and class B operation.

The servo operation of the apparatus of both FIGURE 1 and FIGURE 2 is illustrated by the graph in FIGURE 3 which shows the currents and resulting forces on the armature 13 plotted against the position error. The curve 43 represents the current through one of the motor windings 14 while another curve 44 represents the current in the opposite winding 15. It may be noted that the curves 43 and 44 appear as reflections of each other about an axis which is the point of zero position error. Considering the curve 43, we may note that current commences to flow in the winding 14 at a point of negative position error when a substantial current is flowing in the opposite winding 15. The two curves 43 and 44 cross each other at the point of zero position error, indicating that equal currents are flowing in the windings 14 and 15. As the position error increases positively, the current curve 43 builds up rapidly while the current curve 44 decreases to zero. When the position error amounts to about 5% of the total possible travel of the servo motor, the current as indicated by the curve 43 will substantially reach its maximum; and if the position error is greater than 5% of the total travel, the current in the motor windings and the armature force induced thereby will continue at maximum value.

A further curve 45 represents the force produced by the armature 13 of the servo mechanism plotted against position error. The curve 45 passes through the origin, indicating that when the position error is zero no net force is exerted on the armature by the balanced currents. As the position error increases positively the force likewise increases steeply, initially as a result of the unbalance of currents in the windings 14 and 15, but ultimately as a result of the steeply increasing current in one of the windings. The force curve 45 approaches a maximum similarly to the current curve 43, since the force is caused by and is a function of the current.

FIGURE 4 shows the circuit of the differential amplifier 21 including a first transistor 47 which is biased for constant current conduction into a lead 48. A pair of transistors 49 and 50 respectively sense a signal at an input terminal 51 and a calibration voltage from a potentiometer 52, and divide the constant current into leads 53 and 54 accordingly, whereby complementary signals appear on leads 55 and 56. A push-pull amplifier 11 includes an upper branch having transistors 57, 58, 59 and 60 and a complementary lower branch including transistors 57', 58', 59' and 60' for amplifying the complementary signals from the differential amplifier 21 and for passing direct currents through the pair of output windings 14 and 15, which are part of the linear motor 12.

Resistors 61 and 61' provide voltages proportional to the respective output currents of the windings 14 and 15, which voltages are fed back via resistors 62–63 and 62'–63' to improve the linearity of the amplifier 11. Thus, it may be appreciated that this amplifier arrangement herein provides a differential amplifying stage 21 controlled by a constant current source and passing difference signals to the push-pull amplifier 11 wherein output currents are sensed and fed back.

As discussed heretofore an error signal from the summing junction 18 is applied to the amplifier input terminal 51. A resistor 63 passes the error signal to the base electrode of the transistor 49. In a similar manner, an adjustable calibration voltage is developed at the slider of the potentionmeter 52 and is passed by a resistor 64 to the base electrode of the transistor 50. A further resistor 65 establishes a potential dividing network with the coupling resistor 64. A capacitor 66 may provide a comparatively long time constant such that any transient voltage pulse which may be generated as the potentiometer 52 is adjusted will be smoothed out and will not affect the input to the transistor 50.

The transistor 47 constitutes a constant current generating means, and includes a Zener diode 67 and a resistor 68 connected in series between a point of ground potential and a regulated supply voltage +E. The Zener diode 67 and the resistor 68 provide constant potential generating means for biasing the base electrode of the transistor 47. The emitter electrode of the transistor 47 is coupled to the source of regulated potential +E by a variable resistor 69 which constitutes a means for signal level control. Since the biasing of the transistor 47 is precisely controlled, a constant current will pass from the +E voltage source through the resistor 69 and through the emitter-collector circuit of the transistor 47 to the lead 48. This constant current then divides into two paths: (1) the lead 53, the emitter-collector circuit of the transistor 49 and a load resistor 70; and (2) the lead 54, the emitter-collector circuit of the transistor 50 and another load resistor 71.

Obviously, the total current flowing through the leads 53 and 54 must equal the constant current provided by the transistor 47, and therefore, when one of the transistors 49 or 50 conducts heavily, the conduction of the other transistor is limited. Comparative conduction of the two transistors 49 and 50 is controlled by the comparative biasing provided by (1) the error voltage impressed upon the input terminal 51 and (2) the calibration voltage derived from the potentiometer 52. If the input voltage at the terminal 51 is approximately equal to the calibration voltage from the potentiometer 52, the transistors 49 and 50 will share the constant current available from the lead 48, and the push-pull amplifier 11 will be supplied with substantially equal currents in its two branches to provide current in both output windings 14 and 15. It may therefore be appreciated that when a servo error signal, applied to the input terminal 51, is but slightly different from the calibration voltage, this amplifying system will operate substantially class A with currents flowing in both of the windings 14 and 15 and with an unbalance therein corresponding to the error signal.

On the other hand, if the error signal applied to the input terminal 51 is substantially greater than the calibration voltage, the transistor 49 will be biased into heavy conduction and substantially all of the current available from the lead 48 will flow therethrough, whereby the transistor 50 will be cut off. This will result in a pre-determined maximum current flowing through the winding 14 while the winding 15 receives no current. Conversely if the error signal applied to the input terminal 51 is substantially less than the calibration signal, the transistor 49 will be cut off while the transistor 50 receives all of the current available from the lead 48. This will result in the pre-determined maximum current flowing through the winding 15 while the winding 14 receives no current. Therefore, during times when the error signal is substantially greater than or substantially less than the calibration voltage, the push-pull amplifier 11 will operate in a class B mode, thereby passing maximum current to a selected one of the two windings 14 or 15.

In the analog function generator described in the co-pending application, Serial No. 814,898, supra, in which the amplifier circuit of this invention may be used, the control signal applied to the input terminal 51 may vary continuously. However, the calibration voltage from the potentiometer 52 will remain constant to provide a comparison voltage for operation of the differential amplifier 21. The potentiometer 52 constitutes a means for calibrating the entire servo system including the amplifier circuits, and also including the linear motor 35.

To calibrate the servo system, a standard reference voltage, such as ground potential, may be applied to the input terminal 51, and the load device may be caused to move to a desired reference location by adjusting the potentiometer 52. Adjustment of the potentiometer will vary the voltage therefrom, and the servo-system will respond similarly to its normal operation when the voltage at terminal 51 is varied. When the load device has assumed a proper reference position, the calibration voltage is established for the subsequent operation with the reference potential removed from the input terminal 51.

The leads 55 and 56 are the output from the differential amplifier 21 and the input to the push-pull amplifier 11. A variable resistor 73 provides an attenuation across the input of the push-pull amplifier 11 and constitutes a sensitivity or gain control. An RC circuit including a resistor 74 and a capacitor 75 is likewise coupled across the input of the amplifier 11 to provide proper "roll-off" or high frequency attenuation characteristics for the amplifier, suppressing high frequency oscillation.

The transistors 57 and 57' constitute an input stage for the push-pull amplifier 11 and are coupled to a negative supply voltage —E by respective load resistors 76 and 76'. A second stage of transistors 58 and 58' provide voltage amplification. The emitter electrodes of the transistors 58 and 58' are coupled to a point 77 which is a common reference potential established by a series network including a resistor 78 and a Zener diode 79 coupled between ground potential and a negative supply voltage —E. Resistors 80 and 81 provide a load impedance for the transistor 58 and a coupling to the next transistor 59. Similar resistors 80' and 81' provide coupling between the transistors 58' and 59'. The resistors 81 and 81' are connected together and grounded through a common resistor 82 to provide an attenuation and balancing of the two branches of the push-pull amplifier.

The transistors 59 and 59' are drivers to supply base current to the final stages of power output, transistors 60 and 60'. Transistors 60 and 60' provide a low impedance coupling and furnish substantial output current to the windings 14 and 15. Indeed, a maximum output current of approximately 10 amperes may be supplied selectively to the windings 14 or 15 by this circuit. Since the power dissipation in the two final stages of the push-pull amplifier 11 may be considerable, the transistors 59 and 60 together with the resistor 61 (0.5 ohm) may be provided with a means for rapid heat dissipation such as mounting on a heat sink. The corresponding elements 59', 60' and 61' of the complementary branch of the push-pull amplifier 11 may be similarly mounted on a second heat sink.

The amplifier 11 has the desirable characteristics of a high input impedance at the leads 55 and 56, and a low output impedance with a high current capacity through the windings 14 and 15 of the servo motor 12. To provide a negative feedback for such a circuit, a voltage must be developed corresponding to a current output. Thus, by placing a .5 ohm resistor 61 and 61' in each branch of the push-pull amplifier, a point 84–84' is established in each branch wherein an appropriate feedback signal voltage may be gained. The feedback signal voltage from the output stage of each branch of the amplifier 11 is applied to bias the emitter electrodes of the transistors 57 and 57' which constitute the first stage of the amplifier 11. A further resistor 85 provides a cross coupling between the branches of the push-pull amplifier and specifically between the emitter circuits of the transistors 57 and 57'. This cross coupling attenuates the signals and tends to balance the two complementary stages by providing a current path between the two branches which effectively shunts equal portions of the feedback signals.

Diodes 87 and 87' may be connected to shunt across the windings 14 and 15 respectively. These diodes are back-connected to the complementary branches of the push-pull amplifier 11, and therefore, the diodes will not draw current or load the amplifier during normal operation. If during a time when maximum current is flowing in one of the windings 14 or 15, the amplifier suddenly cuts off, a surge of back voltage may appear as a result of the high inductance of the windings. The diodes 87 and 87' will then provide a path for current flow to prevent a high voltage at the at the collector circuits of the transistors 59 and 60 or 59' and 60'. However, in one practical circuit of this amplifier, the diodes 87 and 87' were found to be unnecessary since the back voltage surges have proved to be insufficient to damage the transistors.

In a particular servo mechanism constructed in accordance with the teaching of this invention, a maximum current of approximately 500 microamperes will flow in either lead 53 or 54, 500 microamperes being the value of the constant current from the lead 48. The servo amplifier 11 is capable of passing approximately 10 amperes of maximum current through a selected one of the motor windings 14 or 15. This maximum current causes a maximum force of approximately two pounds upon the motor armature 13. When the position error is zero, equal currents of approximately 0.1 ampere (one percent of the maximum current) flows in each of the windings 14 and 15. This servo-mechanism was designated to provide a maximum travel of approximately two inches.

From the foregoing it becomes apparent that the servo operation in the apparatus of both FIGURE 1 and FIGURE 2 is of a class AB operation. More specifically, the servo mechanism operates class B at times when the error signal is substantial, but always reverts to class A operation when the error signal becomes slight. Thus, we gain both the advantage of reduced power dissipation inherent in class B systems and the smooth operation without backlash inherent in class A systems. The times when the servo error is substantial are also the times when the greatest amount of power must be supplied to the system, and at these times current flows in but one of the two windings 14 or 15 for the most efficient operation. At the times when the error is slight, the power input to the system will likewise be slight, and therefore, the efficiency of the system is not as important as the elimination of backlash which is gained by class A operation.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. A servo system comprising a linear motor having a pair of windings for generating magnetic flux to drive an armature, a differential amplifier, and a push-pull amplifier capable of passing direct currents coupled between the differential amplifier and the windings of the motor, said differential amplifier including a constant current generating means and a pair of transistors coupled to receive current from the constant current generating means for dividing the current into branch paths in accordance with an input signal.

2. A servo system comprising a linear motor having a pair of windings for generating magnetic flux to drive an armature, a differential amplifier, and a push-pull amplifier capable of passing direct currents coupled between the differential amplifier and the windings of the motor, said differential amplifier including a constant current generating means and a pair of transistors coupled to receive current from the constant current generating means and to provide branch paths for dividing the current into the branch paths in accordance with an input signal, said push-pull amplifier including a plurality of transistors arranged in complementary branches each being coupled to pass currents to a respective one of the windings, the transistors of the differential amplifier being coupled to respective branches of the push-pull amplifier.

3. A servo system comprising a linear motor having a pair of windings for generating magnetic flux to drive an armature, a differential amplifier, and a push-pull amplifier capable of passing direct currents coupled between the differential amplifier and the windings of the motor, said differential amplifier including a constant current generating means and a pair of transistors coupled to receive current from the constant current generating means and to provide branch paths for dividing the current into the branch paths in accordance with an input signal, said push-pull amplifier including a plurality of transistors arranged in complementary branches each being coupled to pass currents to a respective one of the windings, the branches of the push-pull amplifier each being coupled to receive current from the pair of transistors of the differential amplifier and each having a path for feeding back signals corresponding to current flow in the respective one of the windings.

4. A servo system comprising a linear motor having a pair of windings for generating magnetic flux to drive an armature, a differential amplifier, and a push-pull amplifier capable of passing direct currents coupled between the differential amplifier and the windings of the motor, said differential amplifier including a constant current generating means and a pair of transistors coupled to receive current from the constant current devices and to provide branch paths for dividing the current into the branch paths in accordance with an input signal, said push-pull amplifier including a plurality of transistors arranged in complementary branches, each branch having a power output transistor directly coupled to a respective one of the windings of the motor for passing current therethrough, a resistive element coupled to each of the power output transistors and operable to generate a voltage thereacross corresponding to the current flow through the transistor and the respective winding, each branch of the push-pull amplifier having a feedback path coupled to the power output transistor and the resistive element for feeding back a signal representative of the current through the respective winding of the motor.

5. The servo system in accordance with claim 4 and further comprising a unidirectional current conduction means shunting across each of the windings of the motor, each unidirectional conduction means being operable to permit normal current flow from the power output transistor through the winding and being further operable to short circuit transient currents generated by inductive effects of the winding.

6. A servo system comprising a linear motor having a pair of windings for generating magnetic flux to drive an armature, a differential amplifier, and a push-pull amplifier capable of passing direct currents coupled between the differential amplifier and the windings of the motor, said differential amplifier including a first transistor coupled to a source of constant potential whereby the conduction of the transistor is controlled to produce a constant current flow, a pair of further transistors coupled to the first transistor and providing branch paths for dividing the current from the first transistor in accordance with the input signals applied to the pair of transistors, said push-pull amplifier including a plurality of transistors arranged in complementary branches each being coupled to pass currents to a respective one of the windings, the branches of the push-pull amplifier each being coupled to receive current from the pair of transistors of the differential amplifier and each having a path for feeding back signals corresponding to current flow in the respective one of the windings.

7. The servo system in accordance with claim 6 wherein a first of the pair of transistors of the differential amplifier is coupled to a summing point for receiving input signals, and wherein the second of the pair of transistors is coupled to an adjustable source of potential, said pair of transistors being operable to sense and amplify a voltage difference between the input signal and the potential from the adjustable source, said adjustable source of potential being operable to provide a means for indexing the servo motor.

8. A servo system comprising a linear motor having a pair of solenoid windings and an armature movable linearly in spaced relation with the windings, a differential amplifier and a push-pull amplifier capable of passing direct currents coupled between the differential amplifier and the windings of the motor, said differential amplifier including a constant current generating means and a pair of transistors each having emitter electrodes coupled to the constant current generating means, a first of the transistors being coupled to receive an input signal, a means for generating a calibration voltage, the second of the transistors of the differential amplifier being coupled to the calibration voltage generating means, said push-pull amplifier including a plurality of transistors arranged in complementary branches each being coupled to pass currents to a respective one of the windings of the linear motor, the branches of the push-pull amplifier each being coupled to receive current from a respective one of the transistors of the differential amplifier, and each having a path for feeding back signals corresponding to current flow in the respective one of the windings of the linear motor.

References Cited in the file of this patent

UNITED STATES PATENTS

| | | |
|---|---|---|
| 1,044,021 | Clingwald | Nov. 12, 1912 |
| 2,115,086 | Riggs | Apr. 26, 1938 |
| 2,559,513 | Palmer | July 3, 1951 |
| 2,602,911 | Wild | July 8, 1952 |
| 2,709,799 | Howe et al. | Apr. 17, 1955 |
| 2,783,427 | Bracutt | Feb. 28, 1957 |
| 2,937,327 | Vossberg | May 17, 1960 |
| 3,046,487 | Malzen et al. | July 24, 1962 |

OTHER REFERENCES

Terman, F. E.: Fundamental of Radio, First edition, p. 168 and p. 439, McGraw-Hill, 1938.

Ahrendt Servomechanism Practice, McGraw-Hill Book Co. Inc., 1954, chapters 6 and 8.

Rider, J. F.: Engineering Electronics, p. 212, Fig. 8–8; McGraw-Hill, New York, 1957.

Platt, Sidney: Magnetic Amplifiers Theory and Application, page 118, Figures 6–12, and page 182, Fig. 10–8; Prentice Hall Inc., Englewood, N.J.